No. 779,713. PATENTED JAN. 10, 1905.
J. S. KEMP.
MECHANISM FOR TRANSMITTING ROTARY MOTION.
APPLICATION FILED MAY 13, 1904.

Witnesses:
E. A. Volk.
R. W. Renner.

Inventor:
J. S. Kemp
by Wilhelm, Parker & Hare
Attorneys.

No. 779,713.

Patented January 10, 1905.

UNITED STATES PATENT OFFICE.

JOSEPH SARGENT KEMP, OF NEWARK VALLEY, NEW YORK.

MECHANISM FOR TRANSMITTING ROTARY MOTION.

SPECIFICATION forming part of Letters Patent No. 779,713, dated January 10, 1905.

Application filed May 13, 1904. Serial No. 207,753.

*To all whom it may concern:*

Be it known that I, JOSEPH SARGENT KEMP, a citizen of the United States, and a resident of Newark Valley, in the county of Tioga and State of New York, have invented a new and useful Improvement in Mechanism for Transmitting Rotary Motion, of which the following is a specification.

This invention relates to mechanism by which rotary motion is transmitted from the ground or traction wheel of a vehicle or other wheeled structure to a sprocket-wheel, gear-wheel, or other rotary member of a mechanism which is mounted on such vehicle or wheeled structure; and the invention has particular reference to that class of mechanisms in which the ground-wheel is provided with a ratchet-hub from which power is transmitted by a clutch mechanism to the sprocket-wheel, gear-wheel, or other rotary part to be driven.

The object of this invention is to provide a simple, durable, and efficient mechanism of this character in which the clutch mechanism does not engage directly with the ratchet-hub of the ground-wheel, so that the jolts, jars, and shocks which the ground-wheel receives in traveling over the ground are not directly transmitted to the clutch mechanism and in which, furthermore, the driven sprocket-wheel, gear-wheel, or other rotary part is not required to be shifted laterally in engaging or releasing the clutch mechanism.

This mechanism may be advantageously employed, for instance, for driving the beater of a manure-spreader or fertilizer-distributer from the ground-wheels, and this use of the mechanism is represented in the accompanying drawings; but the mechanism is also capable of use for other purposes and in other machines.

Figure 1:
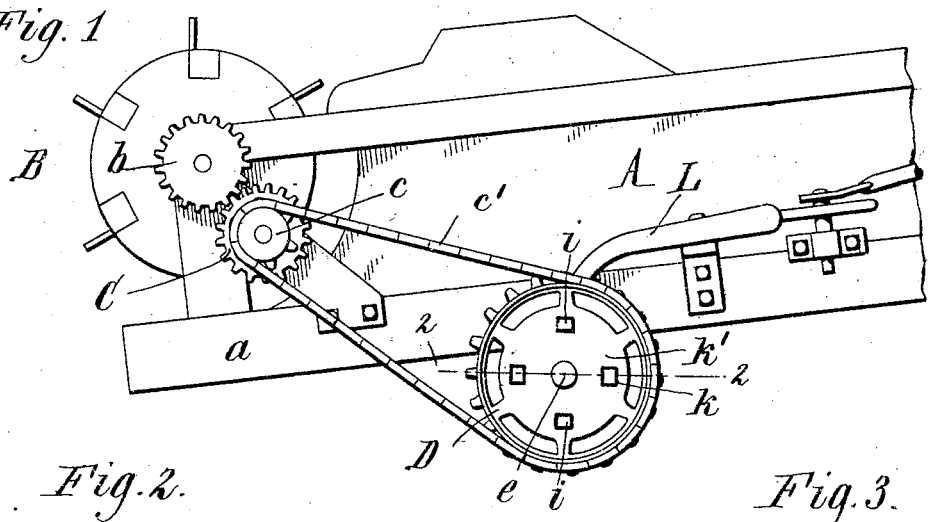
Figure 2:
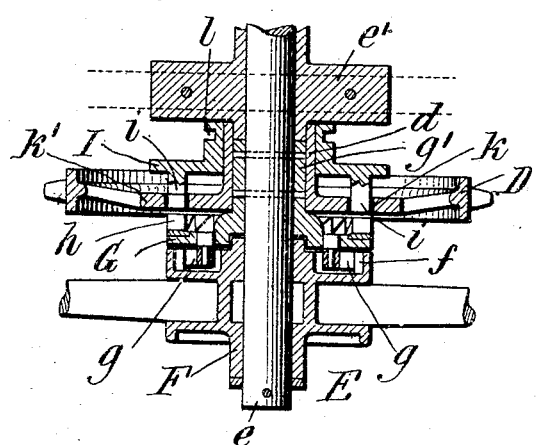
Figure 3:
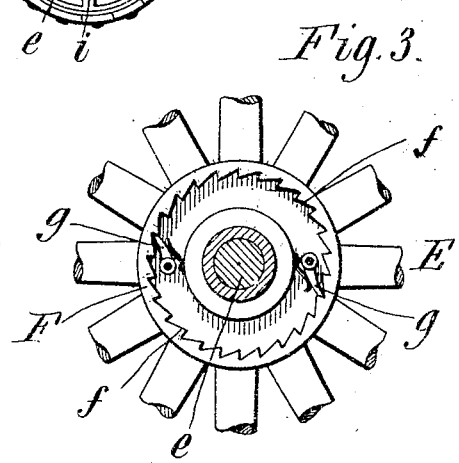
Figure 4:
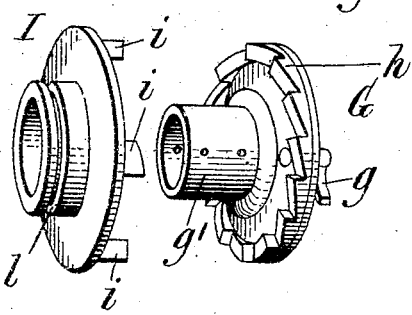
Figure 5:
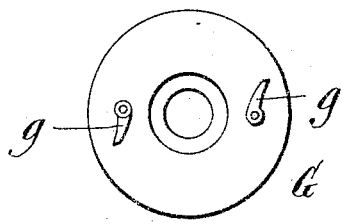

In the accompanying drawings, Figure 1 is a side elevation of the rear portion of a manure-spreader provided with my improved transmitting mechanism with the ground-wheel and pawl-disk removed. Fig. 2 is a horizontal section through the transmitting mechanism in line 2 2, Fig. 1, on an enlarged scale. Fig. 3 is a rear elevation of the ratchet-hub of the ground-wheel. Fig. 4 is a detached perspective view of the pawl-disk and clutch-head viewed from the rear. Fig. 5 is a front elevation of the clutch-disk.

Like letters of reference refer to like parts in the several figures.

A represents the body of a manure-spreader; $a$, one of the longitudinal side sills thereof; B, the rotary beater; $b$, the gear-wheel on the beater-shaft, and C the driving gear-wheel which meshes with the wheel $b$ and is provided with a sprocket-pinion $c$.

$c'$ represents the drive-chain; D, the sprocket-wheel; E, one of the ground or traction wheels, and $e$ the axle on which the traction-wheels are loosely mounted and which is journaled in a bearing $e'$, secured to the side sill $a$.

The hub F of the ground-wheel is provided with internal ratchet-teeth $f$, from which rotary motion is transmitted to a pawl-disk G by pawls $g$, which are arranged on the outer or front side of said disk. The pawl-disk is arranged adjacent to the inner or rear end of the ratchet-hub F and has a hub or sleeve $g'$, which is fitted upon the axle and preferably secured to the same, so that both ground-wheels mounted upon the axle are rendered effective in driving the wheel D. The pawl-disk is provided on its rear side with an annular clutch-face $h$, the teeth of which project rearwardly or toward the sprocket-wheel D. The latter is mounted loosely with its hub $d$ upon the sleeve or hub $g'$ of the pawl-disk and is held against movement in the longitudinal direction of the axle between the pawl-disk G and the bearing $e'$ or by any other suitable means.

I represents a clutch head or disk, which is mounted loosely upon the rearwardly-projecting hub $d$ of the sprocket-wheel, so as to be movable toward and from the clutch-face $h$. This clutch-head is provided with one or more clutch bars or members $i$, four being shown, which project forwardly through openings $k$ in the hub-flange $k'$ of the sprocket-wheel and which are shaped at their front ends to engage the teeth of the clutch-face on the rear side of the pawl-disk. This clutch-head is provided with suitable shifting means—for instance, as shown, with an annular groove $l$, in which a shifting-lever L engages. When the clutch-head is in its rearmost position, (shown in Fig. 2,) the clutch-bars $i$ are withdrawn from the clutch-face of the pawl-disk and the sprocket-wheel is uncoupled from the pawl-disk and ground-wheel and remains idle. By shifting the clutch-head forwardly, so as to engage the clutch-bars with the clutch-face of the pawl-disk, the sprocket-wheel is coupled to the pawl-disk and rotated from the ground-wheels. The pawl-disk being interposed between the ratchet-hub of the ground-wheel on one side and the clutch mechanism and the driven sprocket-wheel on the other side, the driven sprocket-wheel is relieved to a large extent from the shocks, jolts, and jars which the ground-wheel receives in traveling over the ground. As the sprocket-wheel is confined against lateral movement between the bearing and the pawl-disk and is not required to be moved laterally in engaging or releasing the clutch, the chain mechanism is not disturbed in engaging and disengaging the clutch, and these operations are effected easily and quickly.

Instead of a sprocket-wheel a gear-wheel or other rotary part or member may be used, as the nature of the mechanism may require. Each ground-wheel is free to turn backwardly in a well-known manner.

I claim as my invention—

1. The combination of a ground-wheel provided with ratchet-teeth, an axle, a pawl and clutch disk secured to the axle and having on one side a pawl for engagement with said ratchet-teeth and on the other side a clutch-face, a driven wheel which is held against movement toward and from the clutch-face, and a clutch member which is movable toward and from said clutch-face and which engages said driven wheel, substantially as set forth.

2. The combination of a ground-wheel provided with ratchet-teeth, a pawl-disk provided with a pawl mechanism which engages said teeth and having on its rear side a clutch-face, a driven wheel, and a clutch-head provided with a clutch-bar which movably engages said driven wheel and which is movable toward and from the clutch-face of said pawl-disk, substantially as set forth.

3. The combination of a ground-wheel provided with a ratchet-hub, a pawl-disk having on its front side a pawl which engages said ratchet-hub and on its rear side a clutch-face, a driven wheel, and a clutch-head which is movable toward and from said driven wheel and said pawl-disk and which is provided with a clutch-bar which movably engages said driven wheel and is adapted to also engage the clutch-face of said pawl-disk, substantially as set forth.

4. The combination of a ground-wheel provided with a ratchet-hub, a pawl-disk having on its front side a pawl which engages said hub and on its rear side a clutch-face, a driven wheel loosely mounted upon the hub of said pawl-disk, and a clutch-head movably mounted upon the hub of said wheel on the rear side thereof and provided with a forwardly-projecting clutch-bar which movably engages said wheel and is adapted to engage the clutch-face of said pawl-disk, substantially as set forth.

Witness my hand this 9th day of May, 1904.

JOSEPH SARGENT KEMP.

Witnesses:
A. T. WHEAT,
GEORGE CHAMBERLAIN.